United States Patent [19]

Hans et al.

[11] 4,395,587
[45] Jul. 26, 1983

[54] METHOD AND APPARATUS FOR REPRESENTING CHARACTERS

[75] Inventors: Karl Hans, Munich; Helmut Hackstein, Calw-Altburg, both of Fed. Rep. of Germany

[73] Assignee: Siemens Aktiengesellschaft, Berlin & Munich, Fed. Rep. of Germany

[21] Appl. No.: 315,036

[22] Filed: Oct. 26, 1981

[30] Foreign Application Priority Data

Dec. 8, 1980 [DE] Fed. Rep. of Germany ....... 3046216

[51] Int. Cl.$^3$ ............................................. H04L 13/08
[52] U.S. Cl. ..................................... 178/30; 178/17.5; 178/17 C
[58] Field of Search ...................... 178/30, 17 C, 23 R, 178/17.5; 400/109, 110, 111; 364/900

[56] References Cited

U.S. PATENT DOCUMENTS

| | | | |
|---|---|---|---|
| 4,072,820 | 2/1978 | Günther | 178/23 |
| 4,204,089 | 5/1980 | Key et al. | 178/17.5 X |
| 4,251,871 | 2/1981 | Yu | 178/30 X |
| 4,319,077 | 3/1982 | Wiesner | 178/30 X |

FOREIGN PATENT DOCUMENTS 2937725 7/1980 Fed. Rep. of Germany .

Primary Examiner—Stafford D. Schreyer

Attorney, Agent, or Firm—Hill, Van Santen, Steadman, Chiara & Simpson

[57] ABSTRACT

A method and apparatus for representing characters employ a printing unit to print symbols which correspond to characters, the characters being represented either by individual printed symbols or by two or more symbols printed in sequence or two or more overstruck symbols. The characters to be printed are encoded into one or more data words, each data word having a code word associated therewith which is stored in one of three memories which serve to address the printing unit to represent a particular symbol or symbols. If a character is encoded by a single data word, this single data word is supplied to a first memory and if the corresponding code word is contained in the first memory, the code word is released to the printing unit and the symbol is printed. If the corresponding code word is not contained in the first memory, an address word for a second memory is read from the first memory, this address word containing the code words and associated positioning words for the character. If the character is represented by more than one data word, the data words comprising the character are supplied to a third memory. If a corresponding code word is contained in the third memory, this is released to the printing unit, and if a corresponding code word is not contained in the third memory, the data words for the character are supplied sequentially to the first or second memory.

13 Claims, 4 Drawing Figures

FIG 3

| | $2^7$ | | DW | | | | $2^0$ | $2^7$ | | CW/AW | | | | $2^0$ | |
|---|---|---|---|---|---|---|---|---|---|---|---|---|---|---|---|
| A | 0 | 0 | 1 | 0 | 0 | 0 | 1 | 0 | 0 | 0 | 0 | 1 | 0 | 1 | 1 | CW |
| 1 | 0 | 0 | 1 | 0 | 0 | 0 | 1 | 0 | 0 | 0 | 1 | 1 | 1 | 0 | 0 | CW |
| # | 0 | 0 | 1 | 0 | 0 | 0 | 1 | 1 | 1 | 0 | 0 | 0 | 0 | 0 | 0 | AW |
| e | 0 | 0 | 1 | 0 | 0 | 1 | 0 | 0 | 0 | 1 | 1 | 0 | 0 | 1 | 0 | 1 | CW |

| | | $2^6$ | | AW | | | $2^0$ | $2^7$ | | CW/PW | | | | $2^0$ | |
|---|---|---|---|---|---|---|---|---|---|---|---|---|---|---|---|---|
| # | / | 0 | 0 | 0 | 0 | 0 | 0 | 0 | 0 | 1 | 0 | 0 | 1 | 0 | 1 | 1 | CW |
| | | | | | | | | | 0 | 0 | 1 | 0 | 0 | 0 | 0 | 1 | PW |
| / | / | 0 | 0 | 0 | 0 | 0 | 0 | 1 | 0 | 1 | 0 | 0 | 1 | 0 | 1 | 1 | CW |
| | | | | | | | | | 0 | 0 | 0 | 0 | 0 | 0 | 1 | 0 | PW |
| = | | 0 | 0 | 0 | 0 | 0 | 1 | 0 | 0 | 1 | 0 | 0 | 0 | 0 | 1 | 0 | CW |
| | | | | | | | | | 1 | 0 | 1 | 0 | 0 | 0 | 0 | 1 | PW |
| | | | | | | | | | E | A | R | | V | | | |

S2

METHOD AND APPARATUS FOR REPRESENTING CHARACTERS

BACKGROUND OF THE INVENTION

1. Field of the Invention

The present invention relates to a method and apparatus for representing characters by means of a printing unit on a recording medium, and in particular to such a method and apparatus which enables printing of symbols corresponding to input characters, the characters being represented by a single symbol, a series of symbols in sequence, or a number of overstruck symbols.

2. Description of the Prior Art and Related Application

Control units of text stations in conventional text-printing devices are customarily provided with a microprocessor. A transfer of data words via a data bus consisting of several parallel lines generally takes place between one or more input units, the control unit, and one or more output units. Such devices customarily employ a keyboard, a receiver or a memory as an input unit and a printing unit, a transmitter, and/or a further memory unit as an output unit. By means of the printing unit, characters are represented as symbols on a recording medium, generally on paper. The printing unit may contain a printing means such as a hard type printing mechanism or a mosaic printing mechanism. The characters to be represented by means of the printing unit are transferred within the text station via the data bus and are encoded by means of one or more data words.

If the printing unit is designed as a hard type printing mechanism, each type character is called by means of a specific code word. If the type printing mechanism employs, for example, a type wheel which has a plurality of spokes with a specific type symbol at the respective ends thereof, the code words correspond to the spoke numbers. If the printing means is a mosaic printing mechanism, and the characters are stored in a character generator, the code words correspond to the addresses of the characters in the character generator.

Generally the data words are different from the code words so that a conversion from the data words to the code words is necessary. For this purpose a memory is provided in the text station at whose address inputs the data words are stored and at whose outputs the code words are released. A memory of this type can always be used when an individual symbol such as a hard type symbol or a symbol in the character generator is associated with each data word in a one to one relationship. In order to maintain the symbol sets as small as possible, however, printed characters are frequently comprised of a number of symbols which means that the character which is represented on the input means, such as a keyboard, will actually be comprised of more than one data word, each data word corresponding to the respective individual symbols which comprise the printed character. An example is the character "#", which can be comprised of two characters "/" overstruck or overprinted on the character "=". It is also possible to provide characters which are represented by means of several data words which are printed in sequence. In these two situations, it is not possible to automatically convert the data words into the corresponding code words for representing the printed symbol.

It is known from German AS No. 29 37 725, corresponding to co-pending U.S. application Ser. No. 172,074 filed on July 24, 1980 now U.S. Pat. No. 4,319,077 and assigned to the assignee of the present application, to convert the data words of those characters for which no code word exists into code words for symbols which describe the character which is encoded by means of the data word. For example, the data word for the character "§" (or " ¶ " in English convention) can be converted into the code words for the symbols "par". Similarly, the data word for the character "$" can be converted into the code words for the symbols "dol". This conversion is undertaken in that when it is recognized that the character to be represented does not have a one to one relation with a printable symbol in a first memory, an address word stored in the first memory identifies an address location in a second memory in which the code words are stored for the described characters. This method and apparatus, however, represents only those characters which can be represented by a number of individual serially-printed symbols printed at several symbol locations which describe the corresponding character, and does not provide a means for representing characters which are to be represented by a number of overstruck or overprinted symbols.

SUMMARY OF THE INVENTION

It is an object of the present invention to provide a method and apparatus for representing characters which permit representation of the characters independently of whether the characters are to be printed as a series of individual symbols or are to be printed as a composition of individual symbols overstruck or overprinted at the same printing location.

The above object is inventively achieved in a method and apparatus which employ at least three memories which are controlled by a control unit. If the data word corresponding to the character to be printed as a printed symbol has a one to one relationship with a printable symbol, a first memory to which the data word is supplied releases the code word associated therewith to the printing unit and the appropriate symbol is printed. If a single code word corresponding to the data word is not to be found in the first memory, meaning that the character requires more than one code word in order to be printed, the first memory in place of a code word has an address word for a second memory at which address location in the second memory several code words and associated positioning words are released which correspond to those individual symbols which comprise the character to be represented. The code words and positioning words are released to the printing unit. If the character to be printed is represented by more than one data word, the several data words associated with the character are supplied to a third memory and if a corresponding code word is stored in the third memory, this code word is released to the printing unit and the symbols are printed. If a single code word is not present in the third memory corresponding to the data words, the data words are supplied consecutively in time to the first or second memory for processing therein in accordance with the above steps.

The above-described method has the advantage of rendering possible a relatively simple structure for a text station when different types of lettering must be represented by means of a single printing unit. The control unit can be designed in the same manner for all text stations and operate with the same programs for the microprocessor. The memories can be arranged in an exchangeable manner so that a change from one kind of lettering to another can be undertaken simply by exchanging the appropriate memory unit.

In order to attain a particularly attractive printed representation of the characters, a further embodiment of the invention includes the step of supplying the code words to a fourth memory which releases a control word to the printing unit which determines the appropriate advancing before and/or after the printing of a symbol in dependence upon the width of the symbol.

Moreover, in order to prevent a piercing of the recording medium in the case of printed symbols with a small area, another embodiment of the invention feeds code words to a fourth memory which releases a further control word to the printing unit which determines the striking intensity of each individual character in dependence upon its area.

The control of the printing unit in the case of composition characters, that is, overstruck or overprinted characters, is attained in a particularly simple manner when the positioning words include information as to the direction and the amount of positioning of the printing mechanism and/or of the recording medium. The advancing before and/or after the printing of the symbols can thus be undertaken independently of the internal positionings which are directed by the positioning words for the symbols comprising the overall character. It is preferable that the sum of such internal positionings be zero.

The above method can be employed particularly advantageously for controlling a printing unit which utilizes a type wheel of the kind known to those skilled in the art which has a plurality of spokes with hard type symbols associated with the individual characters available on the input means disposed at the respective ends of the spokes. The code words identify the number of specific spokes. The method can also be used to particular advantage with a printing unit which contains a mosaic printing head and an associated character generator, in which case the code words are associated with the addresses of the individual symbols in the character generator.

An apparatus for executing the above method has a first memory in which are stored code words associated with each data word which can be represented by a single printable symbol, and which further has stored therein address words for those data words which require more than one symbol to represent. The appropriate code word is released to the printing unit from the first memory if the particular data word which is supplied by the first memory can be represented by one symbol. If this is not the case, the address word is released which addresses a second memory at which address location a number of code words are located together with positioning words which are then released to the printing unit for printing a number of serial symbols at different printing locations to represent the particular character. A third memory is provided for those characters which require several data words, the third memory containing the code words for those data words and releasing a code word to the printing unit if a particular data word is stored therein, and otherwise transmitting the data words consecutively to the first or second memory for processing therein as described above.

For controlling the printing intensity and advancing, a fourth memory may be provided having an input which is connected with the outputs of the memories in which the control words are stored. The fourth memory releases a control signal to the printing unit which regulates the printing pressure and/or the advancing of the characters.

DESCRIPTION OF THE DRAWINGS

FIG. 3 is a chart representing a selected contact of the first memory which is employed in the apparatus and method respectively shown in FIGS. 1 and 2.

FIG. 4 is a chart showning a selected content of the second memory which is employed in the apparatus and method respectively shown in FIGS. 1 and 2.

DESCRIPTION OF THE PREFERRED EMBODIMENTS

Figure 1:
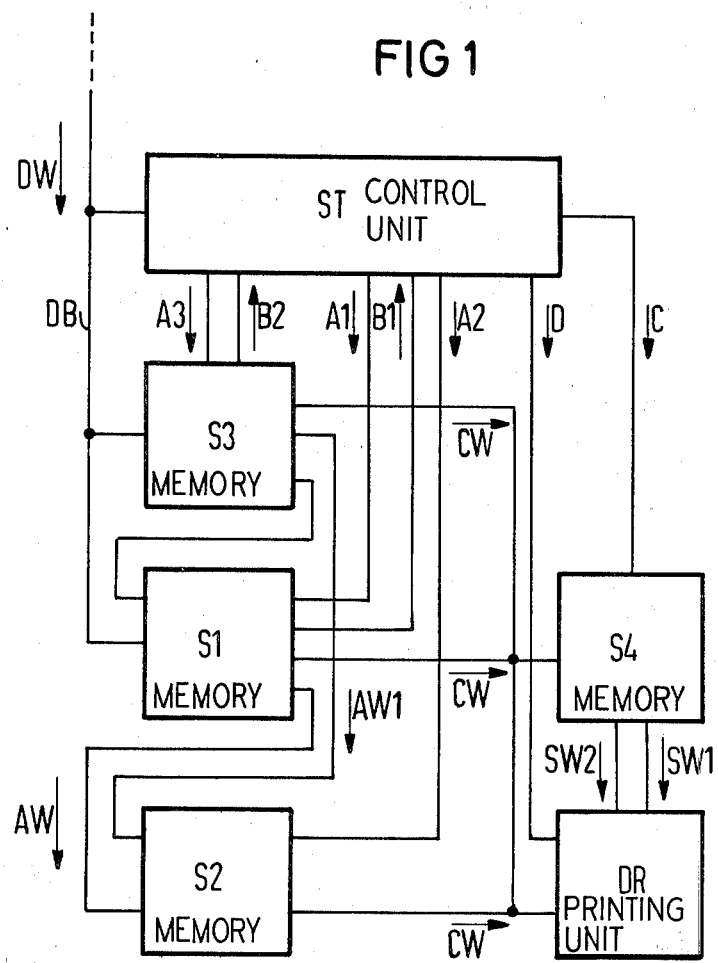
FIG. 1 is a schematic diagram of an apparatus for representing characters constructed in accordance with the principles of the present invention.

An apparatus for representing characters constructed in accordance with the above-described principles is shown in FIG. 1 which includes four memories S1, S2, S3 and S4 which may be components of a single exchangeable memory unit, and a control unit ST. The characters which are to be represented are encoded in data words DW which are received from an input unit (not shown) such as, for example, a keyborad and which are transferred via a data bus DB to the control unit ST as well as the memories S1 and S3. In addition to information identifying the particular character which corresponds to a data word DW, the data word DW contains association data associated to that particular character which may, for example, be information as to whether the particular character is an advancing or a non-advancing character, meaning information as to whether the printing unit carriage and/or the printing medium are to be advanced before and/or after printing of the symbol associated with the character. The data words DW consist, for example, of eight bits.

The control unit ST and the four memories S1 through S4 control the operation of a printing unit DR which prints visible symbols corresponding to the characters which are received by the apparatus from the input means. The printing unit DR may, for example, be a hard type printer having a type wheel with a plurality of spokes, each spoke having a different type symbol disposed on the end thereof. Before printing, the type wheel is positioned such that the corresponding type symbol is in a specified predetermined position. In order to position the type wheel to print a particular symbol, the printing unit DR is supplied with a code word CW which represents the number of a particular spoke carrying a symbol to be printed. The code word CW also consists, for example, of eight bits.

The characters which are available in the input means for representation as visible symbols can be differentiated into four groups. Characters in the first group have a code word CW associated with a single data word representing the character. An individual symbol in the printing unit DR thus corresponds to each data word DW and, in turn, to each character to be represented. Characters of this kind are for example, the characters "a", "A", "1" and "2".

Characters in the second group are also represented by means of a single data word DW, however, are comprised of several individual symbols. For each data word DW, therefore, several code words CW must be generated. Characters such as, for example, "$" and "#" are categorized in this second group.

The characters of the third group are represented by means of several, for example, two, data words DW, however are present as an individual symbol in the printing unit DR. The characters "ä" and "Ä" belong in the third group.

The characters in the fourth group are combination characters which are not present in the input means or the printing unit DR as specific individual characters or symbols. These characters are represented by means of several, for example, two, data words DW and for each data word DW a code word CW is generated and released to the printing unit DR. An example of a character in this fourth group is the character "é".

When a character can be represented by means of one data word DW, that is, a character of the first or second group, the data word DW is supplied to the first memory S1 from the data bus DB by means of an enabling signal A1 received from the control unit ST. If a corresponding code word CW is present in the first memory S1, thus meaning that a character of the first group is present, the code word CW corresponding thereto is released by means of an enabling signal D to the printing unit DR. If a code word CW corresponding to the data word DW is not present in the memory S1, this means that a character of the second group is present and the memory S1 releases a signal B1 to the control unit ST and an address word AW is supplied from the first memory S1 to the second memory S2 by means of an enabling signal A2 from the control unit ST. The address word AW releases a corresponding code word CW from the memory S2 to the printing unit DR, as well as an associated positioning word PW. The code word CW and the associated positioning words PW are released consecutively to the printing unit DR and the corresponding character is printed which is comprised of individual serially printed characters. By means of the positioning words PW, the printing mechanism is shifted either by shifting the printing unit DR and/or the recording medium so that the individual symbols are printed at the correct locations within the character.

The data words DW of characters in the third and fourth groups are first supplied by an enabling signal A3 to a third memory S3. If a corresponding code word CW is present in the third memory S3, meaning that a character of the third group is present, this code word CW is transferred to the printing unit DR. If this is not the case, meaning that a character of the fourth group is present, the memory S3 releases a signal B2 to the control unit ST and the data words DW are supplied consecutively by means of the enabling signal A1 to the memory S1 and are there treated in a manner identical to that of the data words DW for characters in the first and second groups, that is, the corresponding code words CW are either read from the memory S1 or the memory S2. Where applicable, access can also occur directly from the memory S3 by means of an address word AW1 to the memory S2, as also takes place by means of the address words AW in the manner described above.

In addition to being supplied to the printing unit DR, the code words CW are supplied at points in time which are determined by means of an enabling signal C to a fourth memory S4. The fourth memory S4 stores control words SW1 which determine the advancing of the printing mechanism in accordance with the received code word CW in dependence upon the width of the symbol to be printed, and also has control words SW2 stored therein which determine the printing intensity of the symbol corresponding to the code word CW in dependence upon the area of the individual symbol. The control words SW1 and SW2 are supplied to the printing unit DR.

Figure 2:
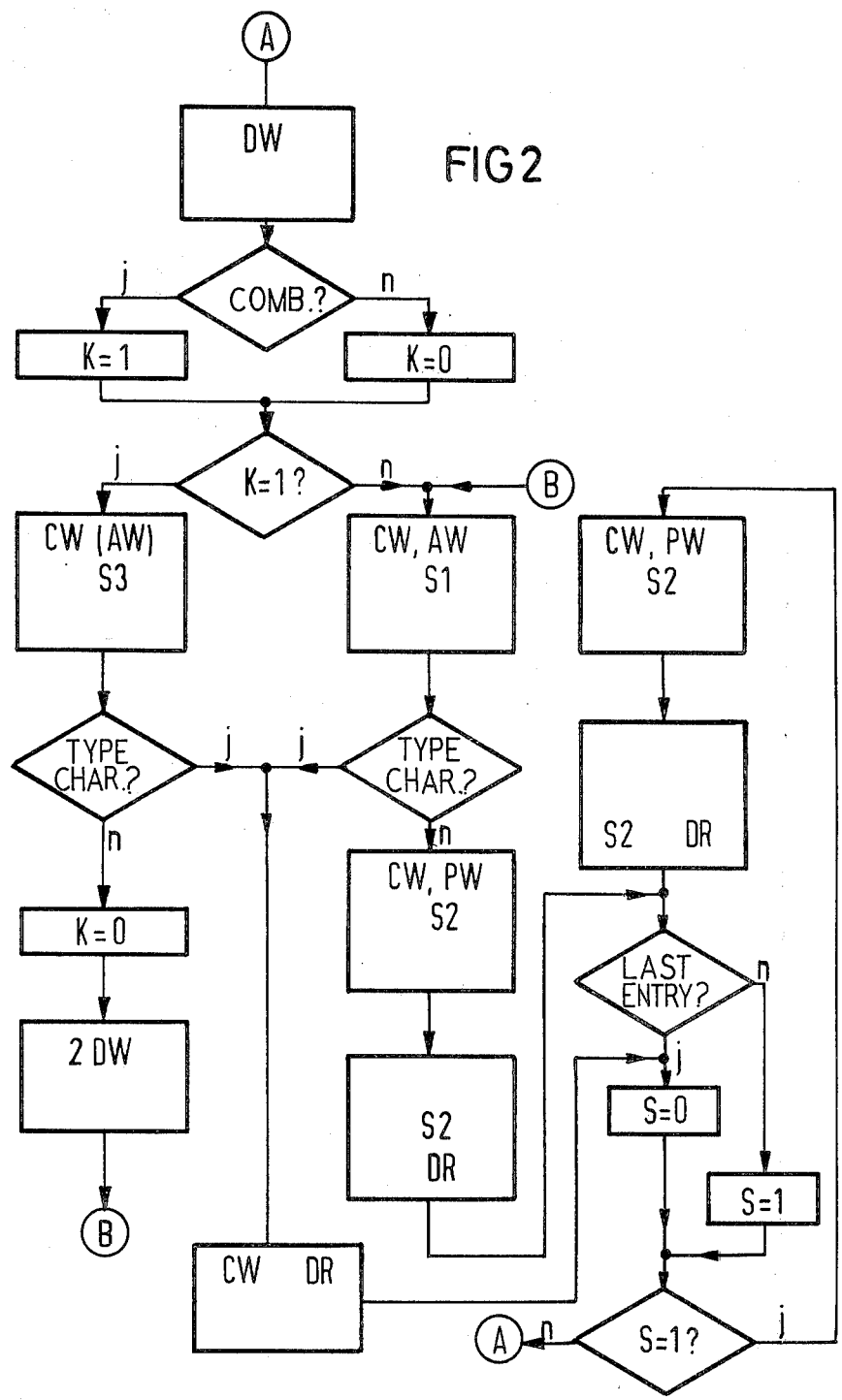
FIG. 2 is a flow chart for a method for representing characters in accordance with the principles of the present invention which is realized in the apparatus shown in FIG. 1.

Further details of the inventive method disclosed and claimed herein will be described in conjunction with the flow diagram shown in FIG. 2. The method begins at a point represented at A whereby a character in the form of a data word DW is received from the input means. It will be first assumed that a character of the first group is to be represented. The method first determines whether the character represented by the data word DW is a combination character, and because it is assumed that a character of the first group is being represented, the interrogation is answered in the negative, a negative answer being designated in FIG. 2 as n.

A status bit K is set at the binary value 0. A subsequent interrogation of the status bit K is also answered in the negative and the control unit ST, represented at B in FIG. 2, releases the signal A1 to the memory S1, whereby the data word DW is supplied to the memory S1. The character is present in the printing unit DR as a type symbol and a corresponding code word CW is thus present in the memory S1. The code word CW is read from the memory S1 and supplied to the printing unit DR, where the corresponding symbol is printed. This sequence of events is shown in FIG. 2 by the interrogation as to whether a type character exists, which is answered in the positive, as represented by j, causing the transmittal of the code word CW to the printer DR. A further count S, whose purpose will be described in greater detail below, is in this situation equal to 0, so that the program returns to A.

If the data word DW is associated with a character of the second group, and is thus not present as a single type symbol, an address word AW is read from the memory S1 and, controlled by the enabling signal A2, is supplied to the memory S2. This character is comprised of several individual symbols which are to be printed in sequence. First, the code word CW and the associated positioning word PW are supplied to the printer DR from the second memory S2. Because at least one further code word CW and an associated positioning word PW belong to the character, the first-transmitted code word CW will not be the last entry and the last entry interrogation is thus answered in the negative and a status bit S assumes the binary value 1. A subsequent interrogation of the status bit S produces a positive answer and the next code word and associated positioning word necessary to represent the character are read from the memory S2 and again supplied to the printer DR. If this now represents the last entry in the series of code words necessary to represent the character, the status bit S assumes a 0 value and the subsequent interrogation of the status bit S is answered in the negative and the program returns to A. The composition of the code words which is utilized to determine which code word is the last entry will be described in greater detail below.

If the data word DW represents a character of the third group, this is a combination character so that the first interrogation is answered in the positive and the status bit K assumes the binary value 1. A subsequent interrogation of the status bit A is thus answered in the positive and under the control of the enabling signal A3, the data words DW are supplied to the memory S3. If a corresponding type symbol, and thus a single corresponding code word CW are present, the control word CW for that character is supplied from the third memory to the printing unit DR in the manner described above.

If the data words DW represent a character in the fourth group, this is also a combination character and the code word CW is first sought in the memory S3. Because a single type symbol for this character is not present in the memory S3, the status bit K, which characterizes a combination character, assumes the binary value 0 and the second data word 2DW comprising the combination is supplied back to the control unit ST, again represented at B. Following this, the first data word DW is supplied to the memory S1 wherein the first data word is treated in the same manner as the previously-described data words DW which were associated with a character of the first or second groups. The second data word 2DW is then retrieved and is also processed in the same manner as a data word DW which represents a character of the first or second groups.

A representative portion of the contents of the first memory S1 is shown in the chart in FIG. 3. At the address identified by the data word DW, either a code word CW or an address word AW is stored in S1. In the example shown in FIG. 3, the characters "A", "1" and "e" belong to the first group of characters described above and thus the corresponding code words CW for those characters are stored in S1, as can be seen in FIG. 3. The character "#", however, is a character of the second group, so that instead of a code word DW, an address word AW is stored in the memory S1, which identifies a memory location in the memory S2. The bit which identifies whether the information at a data word address in S1 as a code word or an address word is the $2^7$ bit, which is a binary 0 for code words and a binary 1 for address words.

A portion of the contents of the memory S2 is shown in the chart in FIG. 4. In the memory S2, the address words from the memory S1, of the type shown in FIG. 3, are present, with the $2^7$ bit removed. For example, the address word AW for the first symbol which comprises the series of symbols which are to be printed to represent the character "#" is shown at the address consisting of all binary zeros in FIG. 4, which is the address word shown in FIG. 3 without the binary value 1 which appears in the $2^7$ bit location in FIG. 3. The chart of FIG. 4 shows the sequence of code words CW and positioning words PW which are called to represent the character "#". The character "#" is comprised of two printings or strikings of the symbol "/" and one printing or striking of the symbol "=". For each code word CW, an associated positioning word is also read. The code word CW identifies the spoke number of a printing wheel or the address of a symbol in a character generator and the positioning word PW states the manner in which the printing mechanism and/or the recording medium must be shifted before the printing. Additionally, the positioning word PW at the location E identifies whether or not a further entry which belongs to the character follows. If the E location has the binary value 0, a further entry follows, and the binary value 1 at the location E identifies the end of a sequence. The E location is the location which is subjected to the "last entry" interrogation in the flow chart in FIG. 2.

A binary value 0 at the location A as shown in FIG. 4 identifies that the printing mechanism is to be moved, while the binary value 1 at this location identifies that the recording medium is to be shifted. A binary value 0 at the location R shown in FIG. 4 identifies whether the printing mechanism is to be moved to the right or whether the recording medium is to be moved upward. In a corresponding manner, a binary value 1 at this location identifies that the printing mechanism is to be moved to the left or that the recording medium is to be moved downward. The amount of specific movement is identified by the binary character V. The positioning words PW are selected such that the sum of the movements in the case of a printed character results in 0.

When the printing unit DR is supplied with a valid code word CW, the control unit ST releases to the memory S4 a signal C in order to read the control words SW1 and SW2 from the memory S4. As described above, the code words SW1 determine the advancing before and/or after the printing of a symbol, and the control words SW2 determine the printing intensity of the individual symbols.

Most text stations afford the possibility of selecting between two different printing intensities, such as normal and strong, by means of a switch or other suitable means. Most printing mechanisms have the further capability of printing the individual symbols in three different printing intensities. The control words SW2 control the printing intensity in dependence upon the area of the specific individual symbol. If the device is operating at a normal printing intendity, individual symbols with a small area are printed weakly and individual characters with a large area are printed with a higher intensity. In a corresponding manner, if the machine is set at a strong printing intensity, individual symbols with a small area are printed with moderate intensity and individual symbols with a large symbol area are printed with a stronger intensity.

Although modifications and changes may be suggested by those skilled in the art it is the intention of the inventors to embody within the patent warranted hereon all changes and modifications as reasonably and properly come within the scope of their contribution to the art.

We claim as our invention

1. A method for representing characters on a recording medium in a printing station either as an individual symbol, a sequence of symbols, or a plurality of overstruck symbols, said characters received in the form of encoded data words from an input means, said data words having at least one code word associated therewith for actuating printing of a selected symbol at said printing station, comprising the steps of:

supplying a data word to a first memory containing code words and address words for a second memory stored at respective addresses corresponding to said data words;

releasing a code word corresponding to said data word which was supplied to said first memory to said printing station if said data word corresponds to a character representable by an individual symbol for printing said individual symbol;

releasing an address word corresponding to said data words supplied to said first memory to said second memory if said data word corresponds to a character representable by a plurality of overstruck symbols, said second memory containing groups of code words and associated position words stored at respective groups of consecutive addresses beginning with said address word, said groups of code words and associated position words respectively corresponding to the symbols and the positions therefor for said characters representable by overstruck symbols;

releasing a selected group of code words and associated position words from said second memory to said printing station for printing the overstruck symbols comprising said character;

supplying a selected plurality of data words to a third memory corresponding to said characters representable by a sequence of symbols,
said third memory containing code words and address words for said second memory at respective addresses corresponding to selected ones of said data words;

releasing a sequence of code words to said printing station from said third memory for printing a sequence of symbols corresponding thereto if addresses corresponding to the data words supplied to said third memory are stored in said third memory;

releasing said data words supplied to said third memory consecutively from said third memory to said first memory if the addresses corresponding to the data words are not stored in said third memory for processing in said first memory and subsequent printing of symbols corresponding thereto; and releasing said address words corresponding to said data words supplied to said third memory from said third memory to said second memory for processing therein if necessary and subsequent printing of symbols corresponding thereto.

2. The method of claim 1 comprising the further steps of:
supplying said code words from said first, second and third memories to a fourth memory interconnected between said first, second and third memories and said printing station;
analyzing the width of the symbol to be printed corresponding to a received code word; and
supplying a control signal to said printing station from said fourth memory for advancing said printing station or said recording medium before and/or after the printing of said symbol in dependence upon the width of said symbol.

3. The method of claim 1 comprising the further steps of:
supplying said code words from said first, second and third memories to a fourth memory which is interconnected between said first, second and third memories and said printing station;
analyzing the area of the symbol corresponding to a received code word; and
supplying a control signal to said printing station for controlling the striking intensity for printing said symbol in dependence upon the area of said symbol.

4. The method of claim 1 wherein said positioning words identify a direction and amount of positioning of a printing mechanism in said printing station and/or of said recording medium.

5. The method of claim 4 wherein a sum of positionings identified by said positioning words for a character is 0.

6. The method of claim 1 wherein said printing station includes a type wheel having a plurality of spokes with individual type symbols disposed at ends of respective spokes and wherein said code words respectively identify said spokes for printing the symbol disposed thereon.

7. The method of claim 1 wherein said printing station includes a mosaic printing head and an associated character generator and wherein said code words are respectively associated with addresses for the individual symbols stored in said character generator.

8. An apparatus for representing characters on a recording medium received in the form of encoded data words from an input means, said data words having at least one code word associated therewith for actuating printing of a selected symbol, said apparatus comprising:
a printing station for printing said characters either as an individual symbol, a sequence of symbols, or a plurality of overstruck symbols;
a first memory to which a data word is supplied containing code words and address words for a second memory at respective addresses corresponding to said data words,
said first memory releasing a code word corresponding to a data word supplied to said first memory to said printing station if said data word corresponds to a character representable by an individual symbol and releasing an address word to said second memory if the data word supplied to said first memory is not representable by a single symbol;
said second memory containing groups of code words and associated position words stored at respective groups of consecutive addresses each beginning with an address word stored in said first memory, said code words and associated position words in said second memory corresponding to the symbols and positions therefor for said characters representable by overstruck symbols,
said second memory releasing said groups of code words and associated positioning words to said printing station for printing said overstruck symbols; and
a third memory to which data words corresponding to said characters representable as a sequence of symbols are supplied, said third memory containing code words and address words for said second memory stored at addresses therein corresponding to selected ones of said data words,
said third memory releasing said control words to said printing station for printing a selected sequence of symbols if addresses corresponding to the data words supplied to said third memory are contained in said third memory and releasing said data words supplied to said third memory to said first memory if said data word is not stored in said third memory for subsequent processing in said first memory and printing of an individual symbol and releasing said address words to said second memory for subsequent processing therein and printing of a plurality of overstruck symbols.

9. The apparatus of claim 8 further comprising a fourth memory interconnected between the outputs of said first, second and third memories and said printing station for supplying respective control signals to said printing station for controlling the printing pressure intensity and the advancing of the printing station.

10. The apparatus of claim 9 wherein said fourth memory analyzes the width of a symbol to be printed corresponding to a code word received from one of said first, second or third memories and generates said signal for controlling the advancing of said printing station in accordance with the width of said symbol.

11. The apparatus of claim 9 wherein said fourth memory analyzes the area of a symbol to be printed corresponding to a code word received from one of said first, second or third memories and generates said signal for controlling the printing pressure intensity in accordance with the area of said symbol.

12. The apparatus of claim 9 wherein said first, second, third and fourth memories are components of an exchangable memory unit.

13. The apparatus of claim 8 wherein said first, second and third memories are components of an exchangeable memory unit.

* * * * *